United States Patent
Agiwal et al.

(10) Patent No.: US 11,805,555 B2
(45) Date of Patent: *Oct. 31, 2023

(54) METHOD AND APPARATUS FOR RANDOM ACCESS PROCEDURE IN WIRELESS COMMUNICATION SYSTEM

(71) Applicant: Samsung Electronics Co., Ltd., Suwon-si (KR)

(72) Inventors: Anil Agiwal, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 107 days.

This patent is subject to a terminal disclaimer.

(21) Appl. No.: 17/171,105

(22) Filed: Feb. 9, 2021

(65) Prior Publication Data

US 2021/0251014 A1 Aug. 12, 2021

Related U.S. Application Data

(60) Provisional application No. 62/975,435, filed on Feb. 12, 2020.

(51) Int. Cl.
*H04W 74/08* (2009.01)
*H04W 72/23* (2023.01)

(52) U.S. Cl.
CPC ....... *H04W 74/0833* (2013.01); *H04W 72/23* (2023.01)

(58) Field of Classification Search
USPC ..................................................... 370/329
See application file for complete search history.

(56) References Cited

U.S. PATENT DOCUMENTS

| 11,240,850 | B2* | 2/2022 | Agiwal | H04W 28/0278 |
| 2018/0220345 | A1* | 8/2018 | Moon | H04B 7/088 |
| 2018/0270869 | A1* | 9/2018 | Tsai | H04W 74/006 |
| 2019/0320467 | A1* | 10/2019 | Freda | H04W 72/14 |
| 2020/0008240 | A1* | 1/2020 | Golitschek Edler von Elbwart | H04W 24/08 |

(Continued)

FOREIGN PATENT DOCUMENTS

KR 10-2019-0105035 A 9/2019

OTHER PUBLICATIONS

Y. Liang, X. Li, J. Zhang and Z. Ding, "Non-Orthogonal Random Access for 5G Networks," in IEEE Transactions on Wireless Communications, vol. 16, No. 7, pp. 4817-4831, Jul. 2017, doi: 10.1109/TWC.2017.2703168. (Year: 2017).*

(Continued)

*Primary Examiner* — Hassan Kizou
*Assistant Examiner* — Oladiran Gideon Olaleye
(74) *Attorney, Agent, or Firm* — Jefferson IP Law, LLP

(57) ABSTRACT

A method performed by a terminal of a 2-step random access procedure in a wireless communication system is provided. The method includes transmitting a message A (MsgA) for the 2-step random access procedure, starting a window at a symbol for receiving a physical downlink control channel (PDCCH) of a message B (MsgB), wherein the symbol is identified based on whether a physical uplink shared channel (PUSCH) is transmitted in the MsgA with a physical random access channel (PRACH), and detecting downlink control information on the PDCCH of the MsgB during the window.

14 Claims, 5 Drawing Sheets

(56) References Cited

U.S. PATENT DOCUMENTS

| | | | |
|---|---|---|---|
| 2020/0029385 A1* | 1/2020 | Bergström | H04W 72/1284 |
| 2020/0045745 A1* | 2/2020 | Cirik | H04W 74/0833 |
| 2020/0107372 A1* | 4/2020 | Agiwal | H04W 80/02 |
| 2020/0146069 A1* | 5/2020 | Chen | H04B 17/327 |
| 2020/0229238 A1* | 7/2020 | Zhang | H04L 1/0026 |
| 2020/0245373 A1* | 7/2020 | Xiong | H04L 27/2602 |
| 2020/0260500 A1* | 8/2020 | Agiwal | H04W 74/004 |
| 2021/0251014 A1* | 8/2021 | Agiwal | H04W 72/042 |
| 2021/0266971 A1* | 8/2021 | Turtinen | H04W 74/0833 |
| 2021/0289563 A1* | 9/2021 | Xu | H04W 74/008 |
| 2021/0329704 A1* | 10/2021 | Yang | H04B 17/318 |
| 2022/0039115 A1* | 2/2022 | Sun | H04W 8/24 |
| 2022/0070941 A1* | 3/2022 | Farag | H04W 74/006 |
| 2022/0086765 A1* | 3/2022 | Zhang | H04W 52/50 |
| 2022/0086913 A1* | 3/2022 | Lin | H04W 72/1268 |
| 2022/0132591 A1* | 4/2022 | Agiwal | H04W 74/0866 |
| 2022/0167427 A1* | 5/2022 | Ko | H04W 74/0833 |
| 2022/0191945 A1* | 6/2022 | Yamamoto | H04W 74/008 |
| 2022/0279398 A1* | 9/2022 | Stanczak | H04W 36/0072 |

OTHER PUBLICATIONS

T. P. C. De Andrade, C. A. Astudillo, L. R. Sekijima and N. L. S. Da Fonseca, "The Random Access Procedure in Long Term Evolution Networks for the Internet of Things," in IEEE Communications Magazine, vol. 55, No. 3, pp. 124-131, Mar. 2017, doi: 10.1109/MCOM.2017.1600555CM. (Year: 2017).*
C. A. Astudillo, T. P. C. de Andrade and N. L. S. da Fonseca, "Allocation of control resources with preamble priority awareness for human and machine type communications in LTE-Advanced networks," 2017 IEEE International Conference on Communications (ICC), 2017, pp. 1-6, doi: 10.1109/ICC.2017.7997136. (Year: 2017).*
E. Soltanmohammadi, K. Ghavami and M. Naraghi-Pour, "A Survey of Traffic Issues in Machine-to-Machine Communications Over LTE," in IEEE Internet of Things Journal, vol. 3, No. 6, pp. 865-884, Dec. 2016, doi: 10.1109/JIOT.2016.2533541. (Year: 2016).*
M. Wang et al., "The Evolution of LTE Physical Layer Control Channels," in IEEE Communications Surveys & Tutorials, vol. 18, No. 2, pp. 1336-1354, Secondquarter 2016, doi: 10.1109/COMST.2015.2510371. (Year: 2016).*
G. C. Madueño, J. J. Nielsen, D. M. Kim, N. K. Pratas, Č. Stefanović and P. Popovski, "Assessment of LTE Wireless Access for Monitoring of Energy Distribution in the Smart Grid," in IEEE Journal on Selected Areas in Communications, vol. 34, No. 3, pp. 675-688, Mar. 2016, doi: 10.1109/JSAC.20 (Year: 2016).*
Nokia et al., "Stage-2 running CR for 2-step RACH", R2-1915889, 3GPP TSG-RAN WG2 Meeting #108, Reno, USA pp. 4, 6, Nov. 8, 2019.
International Search Report dated May 28, 2021, issued in International Application No. PCT/KR2021/001691.
3GPP TS 38.213 V16.0.0 (Dec. 2019), 3rd Generation Partnership Project; Technical Specification Group Radio Access Network; NR; Physical layer procedures for control (Release 16), Dec. 2019.
OPPO, "On Procedure for 2-step RACH", 3GPP Draft, R1-1910384, 3GPP TSG RAN WG1 #98bis, Chongqing, China, Oct. 14, 2019-Oct. 20, 2019, Oct. 5, 2019, XP051789189.
Extended European Search Report dated May 8, 2023, issued in European Patent Application No. 21753343.9.

* cited by examiner

CBRA with 2-Step RA Type

CFRA with 2-Step RA Type

METHOD AND APPARATUS FOR RANDOM ACCESS PROCEDURE IN WIRELESS COMMUNICATION SYSTEM

CROSS-REFERENCE TO RELATED APPLICATION(S)

This application is based on and claims priority under 35 U.S.C. § 119(e) of a U.S. Provisional application Ser. No. 62/975,435, filed on Feb. 12, 2020, in the U.S. Patent and Trademark Office, the disclosure of which is incorporated by reference herein in its entirety.

BACKGROUND

1. Field

The disclosure relates to an apparatus and a method of performing random access procedure in a wireless communication system.

2. Description of Related Art

To meet the demand for wireless data traffic, which has increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid frequency-shift keying (FSK) and quadrature amplitude modulation (QAM) Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination of existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G) system.

Additional aspects will be set forth in part in the description which follows and, in part, will be apparent from the description, or may be learned by practice of the presented embodiments.

In accordance with an aspect of the disclosure, a method performed by a terminal of a 2-step random access procedure in a wireless communication system is provided. The method includes transmitting a message A (MsgA) for the 2-step random access procedure, starting a window at a symbol for receiving a physical downlink control channel (PDCCH) of a message B (MsgB), wherein the symbol is identified based on whether a physical uplink shared channel (PUSCH) is transmitted in the MsgA with a physical random access channel (PRACH), and detecting downlink control information on the PDCCH of the MsgB during the window.

In accordance with another aspect of the disclosure, a terminal of a 2-step random access procedure in a wireless communication system is provided. The terminal includes a transceiver, and at least one processor configured to transmit, via the transceiver, a message A (MsgA) for the 2-step random access procedure, start a window at a symbol for receiving a physical downlink control channel (PDCCH) of a message B (MsgB), wherein the symbol is identified based on whether a physical uplink shared channel (PUSCH) is transmitted in the MsgA with a physical random access channel (PRACH), and detect downlink control information on the PDCCH of the MsgB during the window.

In case of 2 step contention-based random access (CBRA), preambles in certain PRACH occasions are not mapped to any valid PUSCH occasion. In case user equipment (UE) selects a PRACH occasion for which there is no valid PUSCH occasion, UE only transmits PRACH preamble during the MsgA transmission. This is not an efficient approach, as in this case random access (RA) cannot be completed in 2 step. If the network receives the transmitted preamble, it will transmit a fallback random access response (RAR). UE then perform fallback operation i.e. transmit a message 3 (Msg3) in an uplink (UL) grant received in fallback RAR and perform contention resolution using message 4 (Msg4). Additionally, the UE monitors a response for MsgA in a response window which starts at first PDCCH occasion that is at least one symbol away from the end of PUSCH occasion in which MsgA payload is transmitted. In case UE has not transmitted MsgA payload, starting of response window for receiving MsgB cannot be known as per the current procedure. So some enhancement is needed.

Aspects of the present disclosure provide methods so that UE can avoid selection of PRACH occasions which are not mapped to valid PUSCH occasions. This reduces the latency as fallback to 4 step RA can be avoided. Additionally, embodiments in this disclosure provides methods to determine response window for receiving MsgB, in case MsgA payload is not transmitted during the 2 step RA procedure depending on the reason for not transmitting MsgA payload. This ensures that network and UE are synchronized with respect to response window and UE can avoid missing the MsgB transmitted by a gNodeB (gNB).

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
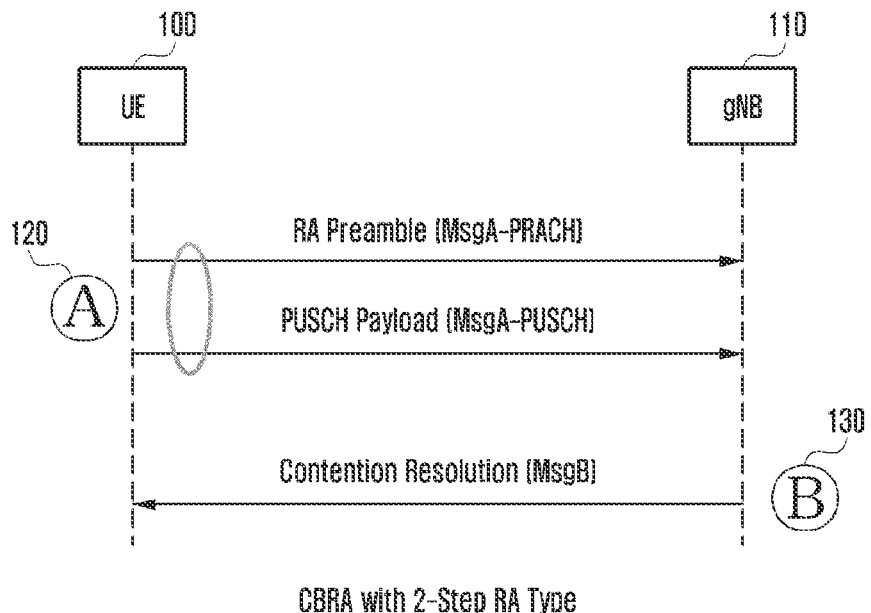
FIGS. 1A and 1B illustrate 2 step random access procedure including a contention-based random access (CBRA) and a contention-free random access (CFRA) according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), fifth generation (5G) NB (5gNB), or next generation NB (gNB).

The "UE" is an entity communicating with a BS and may be referred to as UE, device, mobile station (MS), mobile equipment (ME), or terminal.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So fifth generation wireless communication system (also referred as next generation radio or NR) is being developed to meet the growing demand for high speed data services, support ultra-reliability and low latency applications.

The fifth generation wireless communication system supports not only lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. Example use cases that the fifth generation wireless communication system wireless system is expected to address includes enhanced Mobile Broadband (eMBB), massive Machine Type Communication (m-MTC), ultra-reliable low latency communication (URLL) etc. The eMBB requirements, such as tens of Gbps data rate, low latency, high mobility, etc., address the market segment representing the conventional wireless broadband subscribers needing internet connectivity everywhere, all the time and on the go. The m-MTC requirements like very high connection density, infrequent data transmission, very long battery life, low mobility address and so on and so forth address the market segment representing the Internet of Things (IoT)/Internet of Everything (IoE) envisioning connectivity of billions of devices. The URLL requirements like very low latency, very high reliability and variable mobility and so on and so forth address the market segment representing the Industrial automation application, vehicle-to-vehicle/vehicle-to-infrastructure communication foreseen as one of the enabler for autonomous cars.

In the fifth generation wireless communication system operating in higher frequency (mmWave) bands, UE and gNB communicates with each other using Beamforming. Beamforming techniques are used to mitigate the propagation path losses and to increase the propagation distance for communication at higher frequency band. Beamforming enhances the transmission and reception performance using a high-gain antenna. Beamforming can be classified into Transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit beam patterns of different directions. Each of these transmit beam patterns can be also referred as transmit (TX) beam. Wireless communication system operating at high frequency uses plurality of narrow TX beams to transmit signals in the cell as each narrow TX beam provides coverage to a part of cell. The narrower the TX beam, higher the antenna gain and hence the larger the propagation distance of signal transmitted using beamforming. A receiver can also make plurality of receive (RX) beam patterns of different directions. Each of these receive patterns can be also referred as receive (RX) beam.

The fifth generation wireless communication system, supports standalone mode of operation as well dual connectivity (DC). In DC a multiple Rx/Tx UE may be configured to utilize resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-Radio Access Technology (RAT) Dual Connectivity (MR-DC) operation whereby a UE in Radio Resource Control_Connected (RRC_CONNECTED) is configured to utilize radio resources provided by two distinct schedulers, located in two different nodes connected via a non-ideal backhaul and providing either E-UTRA (i.e. if the node is an ng-eNB) or NR access (i.e. if the node is a gNB). In NR for a UE in RRC_CONNECTED not configured with carrier aggregation/dual connectivity (CA/DC) there is only one serving cell comprising of the primary cell. For a UE in RRC_CONNECTED configured with CA/DC the term 'serving cells' is used to denote the set of cells comprising of the Special Cell(s) and all secondary cells. In NR the term Master Cell Group (MCG) refers to a group of serving cells associated with the Master Node, comprising of the PCell and optionally one or more SCells. In NR the term Secondary Cell Group (SCG) refers to a group of serving cells associated with the Secondary Node, comprising of the PSCell and optionally one or more SCells. In NR PCell (primary cell) refers to a serving cell in MCG, operating on the primary frequency, in which the UE either performs the initial connection establishment procedure or initiates the connection re-establishment procedure. In NR for a UE configured with carrier aggregation (CA), Scell is a cell providing additional radio resources on top of Special Cell. Primary SCG Cell (PSCell) refers to a serving cell in SCG in which the UE performs random access when performing the Reconfiguration with Sync procedure. For Dual Connectivity operation the term SpCell (i.e. Special Cell) refers to the PCell of the MCG or the PSCell of the SCG, otherwise the term Special Cell refers to the PCell.

In the fifth generation wireless communication system, node B (gNB) or base station in cell broadcast Synchronization Signal and Physical Broadcast Channel (PBCH) block (SSB) consists of primary and secondary synchronization signals (PSS, SSS) and system information. The system information includes common parameters needed to communicate in cell. In the fifth generation wireless communication system (also referred as next generation radio or NR), System Information (SI) is divided into the Master Information Block (MIB) and a number of System Information Blocks (SIBs) where:

- the MIB is always transmitted on the PBCH with a periodicity of 80 ms and repetitions made within 80 ms and it includes parameters that are needed to acquire SIB1 from the cell.
- the SIB1 is transmitted on the Downlink Shared Channel (DL-SCH) with a periodicity of 160 ms and variable transmission repetition. The default transmission repetition periodicity of SIB1 is 20 ms but the actual transmission repetition periodicity is up to network implementation. SIB1 includes information regarding the availability and scheduling (e.g. mapping of SIBs to System Information (SI) message, periodicity, SI-window size) of other SIBs with an indication whether one or more SIBs are only provided on-demand and, in that case, the configuration needed by the UE to perform the SI request. SIB1 is cell-specific SIB;
- SIBs other than SIB1 are carried in SystemInformation (SI) messages, which are transmitted on the DL-SCH. Only SIBs having the same periodicity can be mapped to the same SI message.

In the fifth generation wireless communication system, Physical Downlink Control Channel (PDCCH) is used to schedule downlink (DL) transmissions on PDSCH and UL transmissions on PUSCH, where the Downlink Control Information (DCI) on PDCCH includes: Downlink assignments containing at least modulation and coding format, resource allocation, and hybrid Automatic Repeat Request (hybrid-ARQ) information related to DL-SCH; Uplink scheduling grants containing at least modulation and coding format, resource allocation, and hybrid-ARQ information related to uplink shared channel (UL-SCH). In addition to scheduling, PDCCH can be used for: Activation and deactivation of configured PUSCH transmission with configured grant; Activation and deactivation of PDSCH semi-persistent transmission; Notifying one or more UEs of the slot format; Notifying one or more UEs of the physical resource block(s) (PRB(s)) and Orthogonal Frequency Division Multiplexing (OFDM) symbol(s) where the UE may assume no transmission is intended for the UE; Transmission of Transmit Power Control (TPC) commands for Physical Uplink Control Channel (PUCCH) and PUSCH; Transmission of one or more TPC commands for Sounding Reference Signal (SRS) transmissions by one or more UEs; Switching a UE's active bandwidth part; Initiating a random access procedure. A UE monitors a set of PDCCH candidates in the configured monitoring occasions in one or more configured COntrol REsource SETs (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own Demodulation Reference Signal (DMRS). Quadrature Phase Shift Keying (QPSK) modulation is used for PDCCH.

In the fifth generation wireless communication system, a list of search space configurations are signaled by gNB for each configured Bandwidth Part (BWP) wherein each search configuration is uniquely identified by an identifier. An identifier of a search space configuration to be used for specific purpose such as paging reception, SI reception, random access response reception is explicitly signaled by gNB. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion (s) within a slot using the parameters: PDCCH monitoring periodicity (Monitoring-periodicity-PDCCH-slot), the PDCCH monitoring offset (Monitoring-offset-PDCCH-slot), and the PDCCH monitoring pattern (Monitoring-symbol s-PDCCH-within-slot). PDCCH monitoring occasions are there in slots 'x' to x+duration where the slot with number 'x' in a radio frame with number 'y' satisfies the equation below:

$$(y*(\text{number of slots in a radio frame})+x-\text{Monitoring-offset-PDCCH-slot}) \bmod (\text{Monitoring-periodicity-PDCCH-slot})=0$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. Search space configuration includes the identifier of CORESET configuration associated with it. A list of coreset configurations are signaled by gNB for each configured BWP wherein each CORESET configuration is uniquely identified by an identifier. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends on radio frame for each supported Subcarrier Spcaing (SCS) is pre-defined in NR. Each CORESET configuration is associated with a list of TCI (Transmission configuration indicator) states. One downlink (DL) reference signal (RS) identity (ID) for Synchronization Signal Block (SSB) or Channel State Information Reference Signal (CSI-RS) is configured per TCI state. The list of TCI states corresponding to a CORESET configuration is signaled by gNB via Radio Resource Control (RRC) signaling. One of the TCI state in TCI state list is activated and indicated to UE by gNB. TCI state indicates the DL TX beam (DL TX beam is Quasi Co Located (QCLed) with SSB/CSI-RS of TCI state) used by gNB for transmission of PDCCH in the PDCCH monitoring occasions of a search space.

Bandwidth adaptation (BA) is supported in the fifth generation wireless communication system. With BA, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP). BA is achieved by configuring RRC connected UE with BWP(s) and telling the UE which of the configured BWPs is currently the active one. When BA is configured, the UE only has to monitor PDCCH on the one active BWP (i.e., the UE does not have to monitor PDCCH on the entire DL frequency of the serving cell.) In RRC connected state, the UE is configured with one or more DL and UL BWPs, for each configured Serving Cell (i.e. PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by a bwp-InactivityTimer, by RRC signaling, or by the MAC entity itself upon initiation of Random Access procedure. Upon addition of SpCell or activation of an SCell, the DL BWP and UL BWP indicated by a firstActiveDownlinkBWP-Id and a firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer, UE switches the active DL BWP to the default DL BWP or initial DL BWP (if default DL BWP is not configured).

In the 5G wireless communication system, random access (RA) is supported. Random access (RA) is used to achieve uplink (UL) time synchronization. RA is used during initial access, handover, radio resource control (RRC) connection re-establishment procedure, scheduling request transmission, secondary cell group (SCG) addition/modification, beam failure recovery and data or control information transmission in UL by non-synchronized UE in RRC CONNECTED state. Several types of random access procedure is supported.

Contention Based Random Access (CBRA)

This is also referred to as 4 step CBRA. In this type of random access, UE first transmits Random Access preamble (also referred as Msg1) and then waits for Random access response (RAR) in the RAR window. RAR is also referred as Msg2. Next generation node B (gNB) transmits the RAR on physical downlink shared channel (PDSCH). PDCCH scheduling the PDSCH carrying RAR is addressed to RA-radio network temporary identifier (RA-RNTI). RA-RNTI identifies the time-frequency resource (also referred as physical RA channel (PRACH) occasion or PRACH transmission (TX) occasion or RA channel (RACH) occasion) in which RA preamble was detected by gNB. The RA-RNTI is calculated as follows: RA-RNTI=1+s_id+14*t_id+ 14*80*f_id+14*80*8*ul_carrier_id, where s_id is the index of the first orthogonal frequency division multiplexing (OFDM) symbol of the PRACH occasion where UE has transmitted Msg1, i.e. RA preamble; 0≤s_id<14; t_id is the index of the first slot of the PRACH occasion (0≤t_id<80); f_id is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier. Several RARs for various Random access preambles detected by gNB can be multiplexed in the same RAR media access control (MAC) protocol data unit (PDU) by gNB. An RAR in MAC PDU corresponds to UE's RA preamble transmission if the RAR includes an RA preamble identifier (RAPID) of RA preamble transmitted by the UE. If the RAR corresponding to its RA preamble transmission is not received during the RAR window and UE has not yet transmitted the RA preamble for a configurable (configured by gNB in RACH configuration) number of times, the UE goes back to first step i.e. select random access resource (preamble/RACH occasion) and transmits the RA preamble. A backoff may be applied before going back to first step.

If the RAR corresponding to the UE's RA preamble transmission is received, the UE transmits message 3 (Msg3) in UL grant received in RAR. Msg3 includes message such as RRC connection request, RRC connection re-establishment request, RRC handover confirm, scheduling request, SI request etc. It may include the UE identity (i.e. cell-radio network temporary identifier (C-RNTI) or system architecture evolution (SAE)-temporary mobile subscriber identity (S-TMSI) or a random number). After transmitting the Msg3, the UE starts a contention resolution timer. While the contention resolution timer is running, if the UE receives a physical downlink control channel (PDCCH) addressed to C-RNTI included in Msg3, contention resolution is considered successful, contention resolution timer is stopped and RA procedure is completed. While the contention resolution timer is running, if the UE receives contention resolution MAC control element (CE) including the UE's contention resolution identity (first X bits of common control channel (CCCH) service data unit (SDU) transmitted in Msg3), contention resolution is considered successful, contention resolution timer is stopped and RA procedure is completed. If the contention resolution timer expires and the UE has not yet transmitted the RA preamble for a configurable number of times, the UE goes back to the first step (i.e. select random access resource (preamble/RACH occasion)) and transmits the RA preamble. A backoff may be applied before going back to the first step.

Contention Free Random Access (CFRA)

This is also referred as legacy CFRA or 4 step CFRA. CFRA procedure is used for scenarios such as handover where low latency is required, timing advance establishment for secondary cell (Scell), etc. Evolved node B (eNB) assigns to UE dedicated Random access preamble. UE transmits the dedicated RA preamble. ENB transmits the RAR on PDSCH addressed to RA-RNTI. RAR conveys RA preamble identifier and timing alignment information. RAR may also include UL grant. RAR is transmitted in RAR window similar to contention based RA (CBRA) procedure. CFRA is considered successfully completed after receiving the RAR including RA preamble identifier (RAPID) of RA preamble transmitted by the UE. In case RA is initiated for beam failure recovery, CFRA is considered successfully completed if PDCCH addressed to C-RNTI is received in search space for beam failure recovery. If the RAR window expires and RA is not successfully completed and UE has not yet transmitted the RA preamble for a configurable (configured by gNB in RACH configuration) number of times, the UE retransmits the RA preamble.

For certain events such has handover and beam failure recovery if dedicated preamble(s) are assigned to UE, during first step of random access i.e. during random access resource selection for Msg1 transmission UE determines whether to transmit dedicated preamble or non dedicated preamble. Dedicated preambles is typically provided for a subset of SSBs/CSI-RSs. If there is no SSB/CSI-RS having DL Reference Signal Received Power (RSRP) above a threshold amongst the SSBs/CSI-RSs for which contention free random access resources (i.e. dedicated preambles/Random Access Channel Occasions (ROs) are provided by gNB, UE select non dedicated preamble. Otherwise UE select dedicated preamble. So during the RA procedure, one random access attempt can be CFRA while other random access attempt can be CBRA.

Figure 1B:
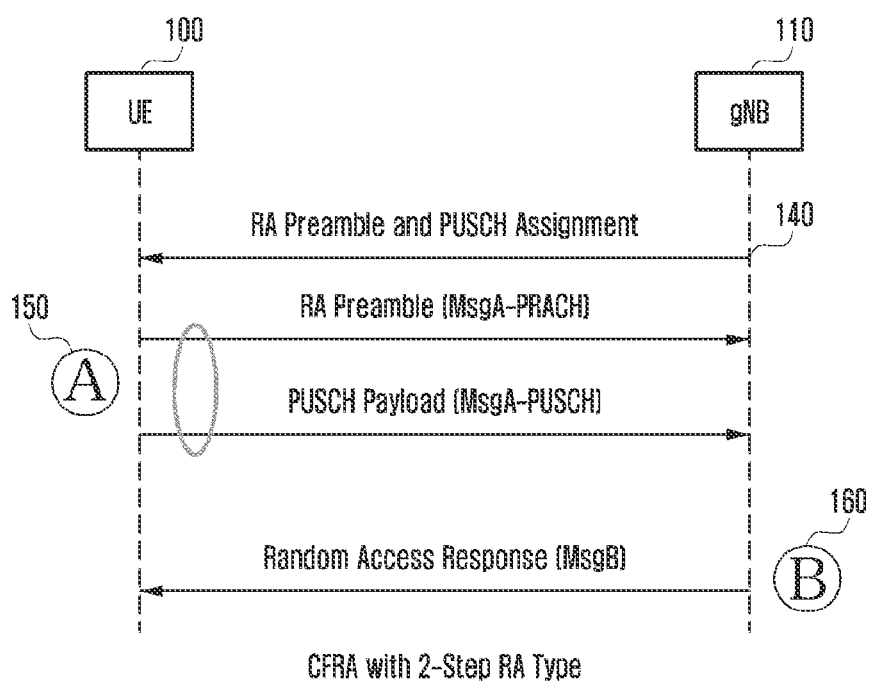

FIGS. 1A and 1B illustrate 2 step random access procedure including a contention-based random access (CBRA) and a contention-free random access (CFRA) according to an embodiment of the disclosure.

2 Step Contention Based Random Access (2 Step CBRA)

Referring to FIG. 1A, in the first step, a UE 100 transmits random access preamble on PRACH and a payload (i.e. MAC PDU) on PUSCH (120). The random access preamble and payload transmission is also referred as message A (MsgA). In the second step, after MsgA transmission, the UE monitors for a response from the network (i.e., gNB 110) within a configured window (130). The response is also referred as message B (MsgB).

If CCCH SDU was transmitted in MsgA payload, UE performs contention resolution using the contention resolution information in MsgB. The contention resolution is successful if the contention resolution identity received in MsgB matches first 48 bits of CCCH SDU transmitted in MsgA. If C-RNTI was transmitted in MsgA payload, the contention resolution is successful if UE receives PDCCH addressed to C-RNTI. If contention resolution is successful, random access procedure is considered successfully completed. Instead of contention resolution information corresponding to the transmitted MsgA, MsgB may include a fallback information corresponding to the random access preamble transmitted in MsgA. If the fallback information is received, UE transmits Msg3 and performs contention resolution using Msg4 as in CBRA procedure. If contention resolution is successful, random access procedure is considered successfully completed. If contention resolution fails upon fallback (i.e. upon transmitting Msg3), UE retransmits MsgA. If the configured window in which the UE monitor network response after transmitting MsgA expires and the UE has not received MsgB including contention resolution information or fallback information as explained above, the UE retransmits MsgA. If the random access procedure is not successfully completed even after transmitting the msgA configurable number of times, UE fallbacks to 4 step RACH procedure i.e. UE only transmits the PRACH preamble.

MsgA payload may include one or more of common control channel (CCCH) service data unit (SDU), dedicated control channel (DCCH) SDU, dedicated traffic channel (DTCH) SDU, buffer status report (BSR) MAC control element (CE), power headroom report (PHR) MAC CE, SSB information, C-RNTI MAC CE, or padding. MsgA may include UE ID (e.g. random ID, S-TMSI, C-RNTI, resume ID, etc.) along with preamble in first step. The UE ID may be included in the MAC PDU of the MsgA. A UE ID such as C-RNTI may be carried in a MAC CE, wherein the MAC CE is included in the MAC PDU. Other UE IDs (such as random ID, S-TMSI, C-RNTI, resume ID, etc.) may be carried in CCCH SDU. The UE ID can be one of random ID, S-TMSI, C-RNTI, resume ID, International Mobile Subscriber Identity (IMSI), idle mode ID, inactive mode ID, etc. The UE ID can be different in different scenarios in which UE performs the RA procedure. When the UE performs RA after power on (before the UE is attached to the network), then the UE ID is the random ID. When the UE performs RA in IDLE state after the UE is attached to the network, the UE ID is S-TMSI. If the UE has an assigned C-RNTI (e.g. in connected state), the UE ID is C-RNTI. In case the UE is in INACTIVE state, the UE ID is resume ID. In addition to the UE ID, some additional control information can be sent in MsgA. The control information may be included in the MAC PDU of the MsgA. The control information may include one or more of connection request indication, connection resume request indication, SI request indication, buffer status indication, beam information (e.g. one or more DL TX beam ID(s) or SSB ID(s)), beam failure recovery indication/information, data indicator, cell/BS/TRP switching indication, connection re-establishment indication, reconfiguration complete or handover complete message, etc.

The UE determines the preambles/PRACH occasions and their association with SS/PBCH blocks as follows:

For 2 step CBRA with common PRACH occasions with 4 step CBRA, a UE is provided a number N of synchronization signal (SS)/PBCH blocks associated with one PRACH occasion by ssb-perRACH-OccasionAndCB-PreamblesPerSSB and a number R of contention-based preambles per SS/PBCH block per valid PRACH occasion by msgA-CB-PreamblesPerSSB. The R contention based preambles per SS/PBCH block per valid PRACH occasion for 2 step CBRA start after the ones for 4 step CBRA.

For 2 step CBRA, with separate PRACH occasions with 4 step CBRA, the UE is provided a number N of SS/PBCH blocks associated with one PRACH occasion and a number R of contention-based preambles per SS/PBCH block per valid PRACH occasion by ssb-perRACH-OccasionAndCB-PreamblesPerSSB-msgA when provided; otherwise, by ssb-perRACH-OccasionAndCB-PreamblesPerSSB.

For 2 step CBRA, with separate PRACH occasions with 4 step CBRA, if N<1, one SS/PBCH block is mapped to 1/N consecutive valid PRACH occasions and R contention based preambles with consecutive indexes associated with the SS/PBCH block per valid PRACH occasion start from zero. If N≥1, R contention based preambles with consecutive indexes associated with SS/PBCH block n, 0≤n≤N−1, per valid PRACH occasion start from preamble index $n \cdot N_{preamble}^{total}/N$ where $N_{preamble}^{total}$ is provided by msgA-totalNumberOfRA-Preambles, and is an integer multiple of N.

For 2 step CBRA, with common PRACH occasions with 4 step CBRA, if N<1, one SS/PBCH block is mapped to 1/N consecutive valid PRACH occasions and R contention-based preambles with consecutive indexes associated with the SS/PBCH block per valid PRACH occasion start from 'last preamble index for 4 step CBRA+1'. If N≥1, R contention based preambles with consecutive indexes associated with SS/PBCH block n, 0≤n≤N−1, per valid PRACH occasion start from preamble index 'last preamble index for 4 step CBRA+1'+$n \cdot N_{preamble}^{total}/N$ where $N_{preamble}^{total}$ is provided by msgA-totalNumberOfRA-Preambles, and is an integer multiple of N.

PRACH occasions are indicated by parameter prach-ConfigIndex. SS/PBCH block indexes provided by ssb-PositionsInBurst in SIB1 or in ServingCellConfigCommon are mapped to valid PRACH occasions in the following order:

First, in increasing order of preamble indexes within a single PRACH occasion

Second, in increasing order of frequency resource indexes for frequency multiplexed PRACH occasions Third, in increasing order of time resource indexes for time multiplexed PRACH occasions within a PRACH slot Fourth, in increasing order of indexes for PRACH slots An association period, starting from frame 0, for mapping SS/PBCH blocks to PRACH occasions is the period such that $N_{Tx}^{SSB}$ SS/PBCH blocks are mapped at least once to the PRACH occasions within the association period, where a UE obtains $N_{Tx}^{SSB}$ from the value of ssb-PositionsInBurst in SIB1 or in ServingCellConfigCommon. An association pattern period includes one or more association periods and is determined so that a pattern between PRACH occasions and SS/PBCH blocks repeats at most every 160 msec.

2 Step Contention Free Random Access (2 Step CFRA)

Referring to FIG. 1B, in this case the gNB 110 assigns to the UE 100 dedicated Random access preamble (s) and PUSCH resource(s) for MsgA transmission (140). RO(s) to be used for preamble transmission may also be indicated. In the first step, the UE 100 transmits random access preamble on PRACH and a payload on PUSCH using the contention free random access resources (i.e. dedicated preamble/PUSCH resource/RO) (150). In the second step, after MsgA transmission, the UE monitors for a response from the network (i.e. gNB) within a configured window (160). If the UE receives PDCCH addressed to C-RNTI, random access procedure is considered successfully completed. If UE receives fallback information corresponding to its transmitted preamble, random access procedure is considered successfully completed.

For certain events such has handover and beam failure recovery if dedicated preamble(s) and PUSCH resource(s) are assigned to UE, during first step of random access i.e. during random access resource selection for MsgA transmission UE determines whether to transmit dedicated preamble or non dedicated preamble. Dedicated preambles is typically provided for a subset of SSBs/CSI-RSs. If there is no SSB/CSI-RS having DL RSRP above a threshold amongst the SSBs/CSI-RSs for which contention free random access resources (i.e. dedicated preambles/ROs/PUSCH resources) are provided by gNB, UE select non dedicated preamble. Otherwise UE select dedicated preamble. So during the RA procedure, one random access attempt can be 2 step CFRA while other random access attempt can be 2 step CBRA.

Upon initiation of random access procedure, the UE first selects the carrier (SUL or NUL). If the carrier to use for the Random Access procedure is explicitly signaled by the gNB, the UE selects the signaled carrier for performing Random Access procedure. If the carrier to use for the Random Access procedure is not explicitly signaled by gNB, and if the Serving Cell for the Random Access procedure is configured with supplementary uplink, and if the RSRP of the downlink pathloss reference is less than rsrp-Threshold-SSB-SUL, then the UE selects the SUL carrier for performing Random Access procedure. Otherwise, the UE selects the NUL carrier for performing Random Access procedure. Upon selecting the UL carrier, the UE determines the UL and DL BWP for random access procedure as specified in section 5.15 of Technical Standard (TS) 38.321. The UE then determines whether to perform 2 step or 4 step RACH for this random access procedure.

If this random access procedure is initiated by PDCCH order and if an ra-PreambleIndex explicitly provided by PDCCH is not 0b000000, the UE selects 4 step RACH.

else if 2 step contention free random access resources are signaled by gNB for this random access procedure, the UE selects 2 step RACH.

else if 4 step contention free random access resources are signaled by gNB for this random access procedure, the UE selects 4 step RACH.

else if the UL BWP selected for this random access procedure is configured with only 2 step RACH resources, the UE selects 2 step RACH.

else if the UL BWP selected for this random access procedure is configured with only 4 step RACH resources, the UE selects 4 step RACH.

else if the UL BWP selected for this random access procedure is configured with both 2 step and 4 step RACH resources, if RSRP of the downlink pathloss reference is below a configured threshold, the UE selects 4 step RACH. Otherwise, the UE selects 2 step RACH.

For 2 step CBRA, the UE determines time resources and frequency resources for PUSCH occasions in an active UL BWP from msgA-PUSCH-config for the active UL BWP. If the active UL BWP is not the initial UL BWP and msgA-PUSCH-config is not provided for the active UL BWP, the UE uses the msgA-PUSCH-config provided for the initial active UL BWP. The PRACH occasions/preambles are mapped to PUSCH occasions (configured by msgA-PUSCH-config) as follows:

A consecutive number of preamble indexes $N_{preamble}$ from valid PRACH occasions in a PRACH slot first, in increasing order of preamble indexes within a single PRACH occasion second, in increasing order of frequency resource indexes for frequency multiplexed PRACH occasions third, in increasing order of time resource indexes for time multiplexed PRACH occasions within a PRACH slot are mapped to a valid PUSCH occasion first, in increasing order of frequency resource indexes $f_{id}$ for frequency multiplexed PUSCH occasions second, in increasing order of DMRS indexes within a PUSCH occasion, where a DMRS index $DMRS_{id}$ is determined first in an ascending order of a DMRS port index and second in an ascending order of a DMRS sequence index [4, TS 38.211]

third, in increasing order of time resource indexes $t_{id}$ for time multiplexed PUSCH occasions within a PUSCH slot fourth, in increasing order of indexes for PUSCH slots corresponding to this PRACH slot where $N_{preamble}=\text{ceil}/(T_{preamble}/T_{PUSCH})$, $T_{preamble}$ is a total number of preambles in valid PRACH occasions per association pattern period, and $T_{PUSCH}$ is a total number of valid sets of PUSCH occasions per association pattern period multiplied by the number of DMRS indexes per valid PUSCH occasion. A PUSCH occasion is valid if it does not overlap in time and frequency with any PRACH occasion associated with either a 4 step RA or a 2 step RA. Additionally, if a UE is provided tdd-UL-DL-ConfigurationCommon (signaled by gNB), a PUSCH occasion is valid if the PUSCH occasion is within UL symbols, or the PUSCH occasion does not precede a SS/PBCH block in the PUSCH slot and starts at least $N_{gap}$ symbols after a last downlink symbol and at least $N_{gap}$ symbols after a last SS/PBCH block symbol, where $N_{gap}$ is zero for preamble SCS of 1.25 KHz/5 KHz, is 2 for preamble SCS of 15/30/60/120 KHz.

Based on the above mapping rule it is possible that preambles in certain PRACH occasions are not mapped to any valid PUSCH occasion. In case the UE selects a PRACH occasion for which there is no valid PUSCH occasion, the UE only transmits PRACH preamble during the MsgA transmission. This is not an efficient approach, as in this case RA cannot be completed in 2 step. If the network receives the transmitted preamble, the network will transmit fallback RAR. The UE then perform fallback operation i.e. transmit Msg3 in UL grant received in fallback RAR and perform contention resolution using Msg4. Additionally, the UE monitors response for MsgA in a response window which starts at first PDCCH occasion that is at least one symbol away from the end of PUS CH occasion in which MsgA payload is transmitted. In the absence of valid PUSCH occasion, starting of response window for receiving MsgB cannot be unknown as per the current procedure. So some enhancement is needed.

A method of 2 step random access according to an embodiment of the disclosure will be explained below.

Step 0: During the random access procedure initialisation, UE first selects the carrier (SUL or NUL). If the carrier to use for the Random Access procedure is explicitly signaled by gNB, UE select the signaled carrier for performing the Random Access procedure. If the carrier to use for the Random Access procedure is not explicitly signaled; and if the Serving Cell for the Random Access procedure is configured with supplementary uplink and if the RSRP of the downlink pathloss reference is less than rsrp-Threshold-SSB-SUL: UE select the SUL carrier for performing Random Access procedure. Otherwise, UE select the NUL carrier for performing Random Access procedure.

Upon selecting the UL carrier, UE determines the UL and DL BWP for random access procedure as specified below:
    For the selected carrier of this Serving Cell:
      1> if PRACH occasions are not configured for the active UL BWP; or
      1> if the random access procedure is initiated by PDCCH order and the ra-PreambleIndex explicitly provided by PDCCH is not 0b000000 and 4 step PRACH occasions are not configured for the active UL BWP (or if the random access procedure is initiated by PDCCH order and the ra-PreambleIndex explicitly provided by PDCCH is not 0b000000 and 4 step PRACH occasions are not configured for the active UL BWP and 2 step PRACH occasions are configured for the active UL BWP):
        2> switch the active UL BWP to BWP indicated by initialUplinkBWP;
        2> if the Serving Cell is an SpCell:
          3> switch the active DL BWP to BWP indicated by initialDownlinkBWP.
      1> else:
        2> if the Serving Cell is an SpCell:
          3> if the active DL BWP does not have the same bwp-Id as the active UL BWP:
            4> switch the active DL BWP to the DL BWP with the same bwp-Id as the active UL BWP.

The UE then determines whether to perform 2 step or 4 step RACH for this random access procedure.

If this random access procedure is initiated by PDCCH order and if the ra-PreambleIndex explicitly provided by PDCCH is not 0b000000; or
    if the Random Access procedure was initiated for SI request and the Random Access Resources for SI request have been explicitly provided by RRC; or
    if the Random Access procedure was initiated for beam failure recovery and if the contention-free Random Access Resources for beam failure recovery request for 4-step random access have been explicitly provided by RRC for the BWP selected for random access procedure; or
    if the Random Access procedure was initiated for reconfiguration with sync and if the contention-free Random Access Resources for 4-step random access have been explicitly provided in rach-ConfigDedicated for the BWP selected for random access:
      the UE selects 4 step RA.
    else if the BWP selected for random access procedure is configured with both 2-step and 4-step random access resources and the RSRP of the downlink pathloss reference is above RSRP_THRESHOLD_RA_TYPE_SELECTION; or
    if the BWP selected for random access procedure is only configured with 2-step random access resources (i.e. no 4-step RACH resources configured); or
    if the Random Access procedure was initiated for reconfiguration with sync and if the contention-free Random Access Resources for 2-step random access have been explicitly provided in rach-ConfigDedicated for the BWP selected for random access:
      the UE selects 2 step RA.
    Else: the UE selects 4 step RA A UL carrier for random access procedure is explicitly signaled by gNB during handover or reconfiguration with sync for 4 step RACH. If the gNB wants UE to select NUL for 4 step RACH, the gNB provides 4 step contention free random access resources for NUL in reconfiguration message. If the gNB wants the UE to select SUL for 4 step RACH, the gNB provides 4 step contention free random access resources for SUL in reconfiguration message. A UL carrier for 2 step random access procedure may also be explicitly signaled by gNB during handover or reconfiguration with sync. If the gNB wants the UE to select NUL for 2 step RACH, the gNB provides 2 step contention free random access resources for NUL in reconfiguration message. If gNB wants UE to select SUL for 2 step RACH, it provides 2 step contention free random access resources for SUL in reconfiguration message.

If 2 step contention free random access resources for SUL is signaled by gNB during handover or reconfiguration with sync, the UE selects SUL and RACH type selected is 2 step RACH. If 2 step contention free random access resources for NUL is signaled by the gNB during handover or reconfiguration with sync, the UE selects NUL and RACH type selected is 2 step RACH. If 4 step contention free random access resources for SUL is signaled by the gNB during handover or reconfiguration with sync, the UE selects SUL and RACH type selected is 4 step RACH. If 4 step contention free random access resources for NUL is signaled by the gNB during handover or reconfiguration with sync, the UE selects NUL and RACH type selected is 4 step RACH.

Based on the above criteria, the UE has selected 2 step RA procedure. The UE initializes the preamble transmission counter (PREAMBLE_TRANSMISSION_COUNTER) to zero.

Step 1A: If contention Free Random Access Resources are provided by the gNB and there is at least one SSB/CSI-RS having SS-RSRP/CSI-RSRP above a threshold amongst the SSBs/CSI-RSs for which contention free random access resources are provided, the UE transmits MsgA i.e. Random Access Preamble (also referred as MsgA preamble) in PRACH occasion and MAC PDU (also referred as MsgA payload) in PUSCH occasion using the assigned contention free random access resources.

In this case, the UE selects an SSB/CSI-RS having SS-RSRP/CSI-RSRP above a threshold amongst the SSBs/CSI-RSs for which contention free random access resources are provided. The UE selects the random access preamble (ra-PreambleIndex) assigned by gNB corresponding to selected SSB/CSI-RS. UE selects the next available PRACH occasion corresponding to selected SSB/CSI-RS. UE select the PUSCH occasion corresponding to selected PRACH occasion and preamble. (Note that there can be several PUSCH occasions/resources corresponding to a PRACH slot of selected PRACH occasion. gNB may indicate which PUSCH occasion/resource to be used in dedicated signaling for a given SSB/CSI-RS).

Step 1B: Otherwise (i.e., if contention Free Random Access Resources are not provided by gNB or if there is no available SSB/CSI-RS having SS-RSRP/CSI-RSRP above a threshold amongst the SSBs/CSI-RSs for which contention free random access resources are provided), UE transmits MsgA i.e. PRACH Preamble (also referred as MsgA preamble) in PRACH occasion and MAC PDU (also referred as MsgA payload) in PUSCH occasion using the contention based random access resources.

SSB selection: In this case UE selects an SSB having SS-RSRP above a threshold amongst the transmitted SSBs. If no SSB having SS-RSRP above a threshold is available, UE select any SSB.

Preamble group selection: UE select random access preamble group as follows:
1> if MsgA has not yet been transmitted:
2> if Random Access Preambles group B for 2-step RA is configured:
3> if the potential MsgA payload size (UL data available for transmission plus MAC header and, where required, MAC CEs) is greater than the transport block size of the MsgA payload associated with preamble group A and the nominal required PUSCH power for MsgA is less than PCMAX (of the Serving Cell performing the Random Access Procedure); alternately, if the potential MsgA payload size (UL data available for transmission plus MAC header and, where required, MAC CEs) is greater than ra-MsgASizeGroupA and the pathloss is less than PCMAX (of the Serving Cell performing the Random Access Procedure)—msgA-preambleReceivedTargetPower—msgA-DeltaPreamble—messageAPowerOffsetGroupB), or
3> if the Random Access procedure was initiated for the CCCH logical channel and the CCCH SDU size plus MAC subheader is greater than the transport block size of the MsgA payload associated with preamble group A (or if the Random Access procedure was initiated for the CCCH logical channel and the CCCH SDU size plus MAC subheader is equal to transport block size of the MsgA payload associated with preamble group B):
4> select the Random Access Preambles group B.
3> else:
4> select the Random Access Preambles group A.
2> else:
3> select the Random Access Preambles group A.
1> else if MsgA has been transmitted using contention free random access resources and has not yet been transmitted using contention based random access resources:
2> if Random Access Preambles group B for 2-step RA is configured and if the payload size of the MsgA (including the MAC header and all the MAC CEs) is greater than the transport block size of the MsgA payload size associated with preamble group A (or if the Random Access procedure was initiated for the CCCH logical channel and the CCCH SDU size plus MAC subheader):
3> select the Random Access Preambles group B.
2> else:
3> select the Random Access Preambles group A.
1> else (i.e. MsgA is being retransmitted using contention based random access resources):
2> select the same group of Random Access Preambles as was used for the Random Access Preamble transmission attempt corresponding to the first transmission of MsgA using contention based random access resources.

Preamble Selection: In the current design, the UE selects a Random Access Preamble randomly with equal probability from the Random Access Preambles associated with the selected SSB and the selected Random Access Preambles group.

Figure 2:
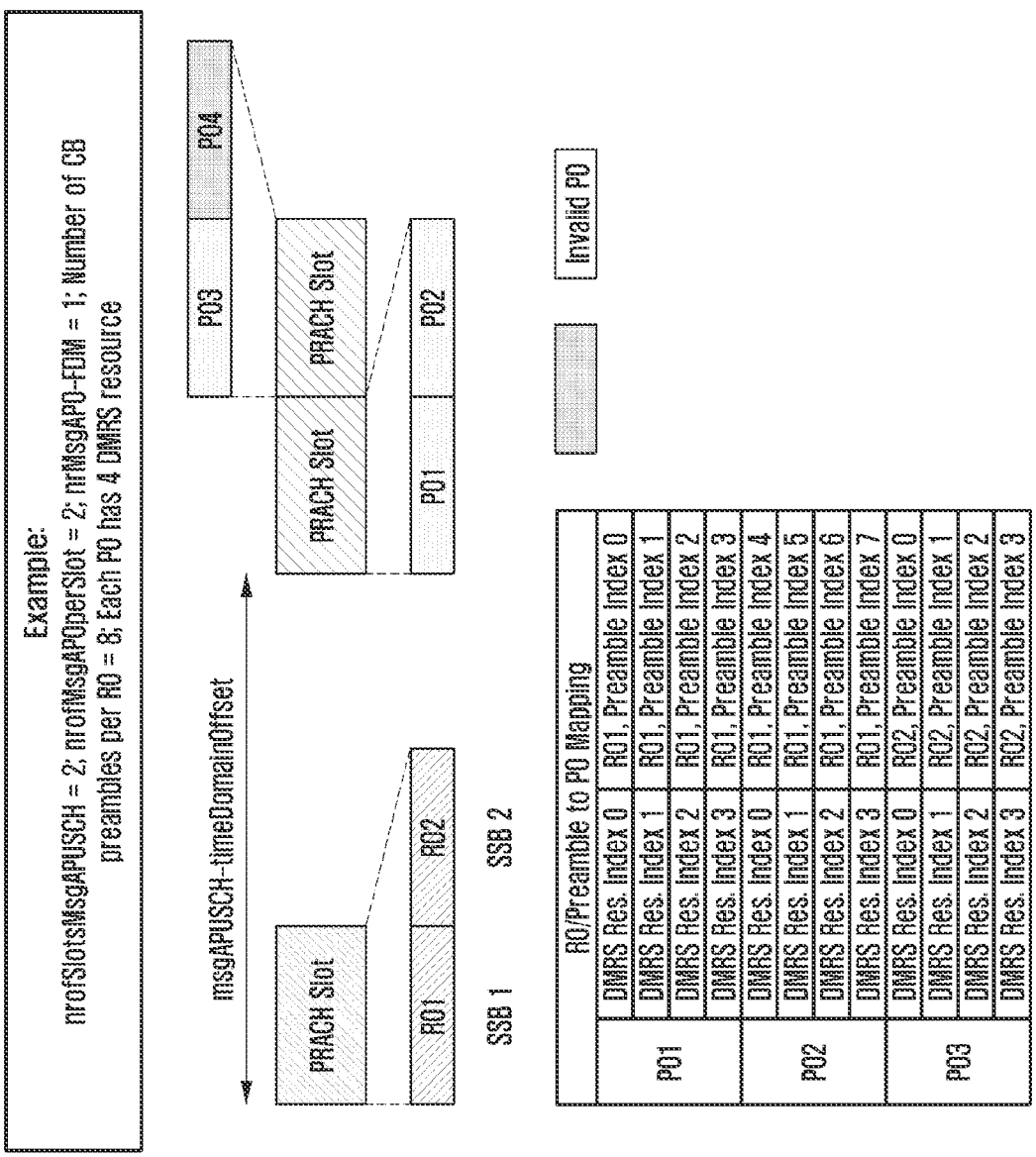
FIG. 2 illustrates preamble selection in case of invalid PUSCH occasion according to an embodiment of the disclosure.

FIG. 2 illustrates preamble selection in case of invalid PUSCH occasion according to an embodiment of the disclosure.

Referring to FIG. 2, if some of the preambles in certain PRACH occasions (i.e., ROs) are not associated with PUSCH resource unit (i.e. PUSCH occasion+DMRS resource or PUSCH occasion), it is proposed that UE can avoid those during the preamble selection. As shown in FIG. 2, there are two ROs in a PRACH slot. These are mapped to SSB1 and SSB2 respectively. Each RO has 8 preambles. There are two PUSCH slots each having 2 PUSCH occasions (i.e. PO(s)). One of the POs in $2^{nd}$ PUSCH slot is not valid. A PUSCH occasion is valid if it does not overlap in time and frequency with any PRACH occasion associated with either a 4 step random access procedure or a 2 step random access procedure. Additionally, if a UE is provided tdd-UL-DL-ConfigurationCommon, a PUSCH occasion is valid if it is within UL symbols, or it does not precede a SS/PBCH block in the PUSCH slot and starts at least $N_{gap}$ symbols after a last downlink symbol and at least $N_{gap}$ symbols after a last SS/PBCH block symbol, where $N_{gap}$ is zero for preamble SCS of 1.25 and 5 KHz, is 2 for preamble SCS of 15/30/60/120 KHz. Each PO has 4 DMRS resources. In this case, if the UE has selected SSB 2 for PRACH transmission, as per current design the UE will randomly select from preambles 0 to 7. However preambles 4 to 7 are not mapped to valid PUSCH resource unit (PRU). So it is proposed that the UE can randomly select from preambles 0 to 3 instead of 4 to 7.

According to an embodiment of the proposed disclosure, amongst the Random Access Preambles associated with the selected SSB and the selected Random Access Preambles group, the UE excludes the preambles not mapped to valid PUSCH occasions when selecting the random access preamble. The UE selects the Random Access Preamble randomly with equal probability from the remaining Random Access Preambles associated with the selected SSB and the selected Random Access Preambles group.

According to an embodiment of the proposed disclosure, amongst the Random Access Preambles associated with the selected SSB and the selected Random Access Preambles group, for the PRACH occasion selected for PRACH transmission, the UE excludes the preambles not mapped to valid PUSCH occasions when selecting the random access preamble. UE select Random Access Preamble randomly with equal probability from the remaining Random Access Preambles associated with the selected SSB and the selected Random Access Preambles group.

In case all the Random Access Preambles associated with the selected SSB and the selected Random Access Preambles group are not mapped to valid PUSCH occasions, the UE selects a Random Access Preamble randomly with equal probability from the Random Access Preambles associated with the selected SSB and the selected Random Access Preambles group. In this case, the UE does not exclude the preambles not mapped to valid PUSCH occasions when selecting the random access preamble.

PRACH occasion selection: In the current design, the UE selects the next available PRACH occasion corresponding to selected SSB/CSI-RS. The UE determines the next available PRACH occasion from the PRACH occasions corresponding to the selected SSB (the MAC entity shall select a PRACH occasion randomly with equal probability amongst the consecutive PRACH occasions corresponding to the selected SSB; the MAC entity may take into account the possible occurrence of measurement gaps when determining the next available PRACH occasion corresponding to the selected SSB).

According to an embodiment of the disclosure, the UE first excludes the PRACH occasions not mapped to valid PUSCH occasions when determining the next available PRACH occasion corresponding to the selected SSB. The UE then selects next available PRACH occasion from the remaining PRACH occasions corresponding to the selected SSB (the MAC entity shall select a PRACH occasion randomly with equal probability amongst the consecutive PRACH occasions corresponding to the selected SSB; the MAC entity may take into account the possible occurrence of measurement gaps when determining the next available PRACH occasion corresponding to the selected SSB). The PRACH occasion can be selected before preamble selection.

Figure 3:
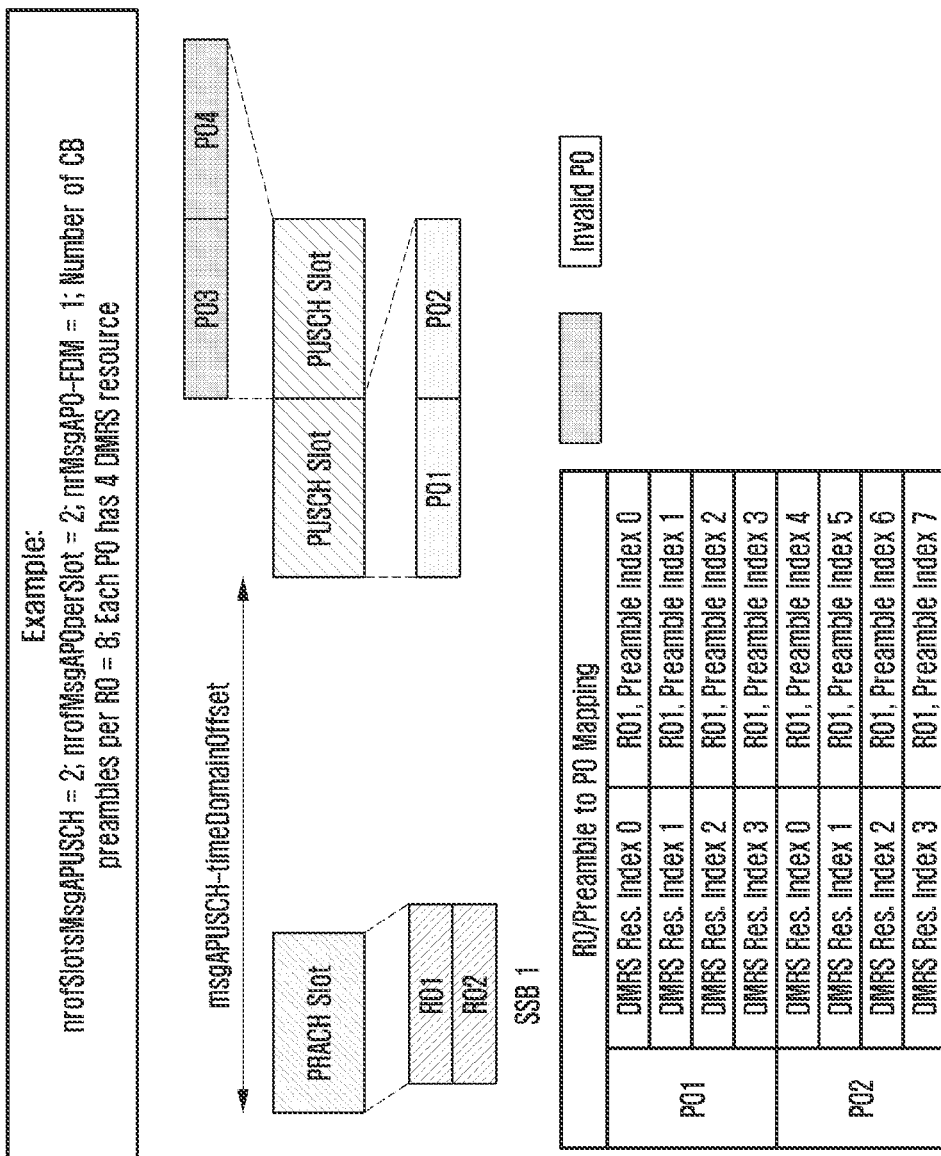
FIG. 3 illustrates PRACH occasion selection in case of invalid PUSCH occasion according to an embodiment of the disclosure.

FIG. 3 illustrates PRACH occasion selection in case of invalid PUSCH occasion according to an embodiment of the disclosure.

Referring to FIG. 3, there are two FDMed ROs in a PRACH slot mapped to SSB1. Each RO has 8 preambles. There are two PUSCH slots each having 2 POs. One of the PUSCH slot is not valid. A PUSCH occasion is valid if it does not overlap in time and frequency with any PRACH occasion associated with either a 4 step random access procedure or a 2 step random access procedure. Additionally, if a UE is provided tdd-UL-DL-ConfigurationCommon, a PUSCH occasion is valid if it is within UL symbols, or the UE does not precede a SS/PBCH block in the PUSCH slot and starts at least $N_{gap}$ symbols after a last downlink symbol and at least $N_{gap}$ symbols after a last SS/PBCH block symbol, where $N_{gap}$ is zero for preamble SCS of 1.25 and 5 KHz, is 2 for preamble SCS of 15/30/60/120 KHz. In this case, if the UE has selected SSB 1 for PRACH transmission, UE will randomly select from RO1 and RO2. However, since preambles in RO2 is not mapped to valid PRUs, he UE can skip RO2 in RO selection.

PUSCH occasion selection: The UE selects the PUSCH occasion corresponding to selected PRACH occasion and preamble. If the PUSCH occasion is not available, the UE may only transmit PRACH preamble. Alternately, If PUSCH occasion is not available, the UE may perform step 1 again.

Step 2: The UE then starts msgB-ResponseWindow and monitor the PDCCH for random access response (i.e. MsgB) in msgB-ResponseWindow. In order to determine the start of msgB-ResponseWindow, the UE first determines whether the MsgA payload was transmitted or not during the MsgA transmission.

If only the PRACH preamble is transmitted (i.e., the MsgA payload is not transmitted) during the MsgA transmission, the UE further determines whether UE has not transmitted MsgA payload due to unavailability of valid PUSCH occasion for MsgA payload transmission or not.

If the UE has not transmitted MsgA payload due to unavailability of valid PUSCH occasion for MsgA payload transmission:
  Option 1: MsgB reception window starts at first PDCCH occasion that is at least one symbol away from the end of RO in which random access preamble (also referred as MsgA preamble) is transmitted. PDCCH occasions for MsgB reception are signaled by RAR search space parameter.
  Option 2: MsgB reception window starts at first PDCCH occasion that is at least one symbol away from the start of first PUSCH slot corresponding to RACH slot in which random access preamble (also referred as MsgA preamble) is transmitted. PDCCH occasions for MsgB reception are signaled by RAR search space parameter.
  Option 3: MsgB reception window starts at first PDCCH occasion that is at least one symbol away from the end of last valid PUSCH occasion (PO) corresponding to RACH slot in which random access preamble (also referred as MsgA preamble) is transmitted. PDCCH occasions for MsgB reception are signaled by RAR search space parameter.
  Option 4: MsgB reception window starts at first PDCCH occasion that is at least one symbol away from the end of a pre-defined valid PO (first or last or any other) corresponding to RACH slot in which random access preamble (also referred as MsgA preamble) is transmitted. PDCCH occasions for MsgB reception are signaled by RAR search space parameter.

If the UE has not transmitted MsgA payload due to Listen before Talk (LBT) failure in PUSCH occasion selected for MsgA payload transmission (in this case PUSCH occasion is selected for MsgA payload transmission in step 1, i.e. the UE has not transmitted MsgA payload even though valid PUSCH occasion was available. In case of unlicensed spectrum, before transmitting in PUSCH occasion, UE performs channel access procedure (also refereed as LBT) to determine whether the channel is available or not. If LBT fails i.e. channel is not available, UE does not transmit):
  MsgB reception window starts at first PDCCH occasion that is at least one symbol away from the end of PUSCH occasion selected for MsgA payload transmission. PDCCH occasions for MsgB reception are signaled by RAR search space parameter.

Else if both PRACH preamble and MsgA payload is transmitted during the MsgA transmission:
  MsgB reception window starts at first PDCCH occasion that is at least one symbol away from the end of PUSCH transmission. PDCCH occasions for MsgB reception are signaled by RAR search space parameter.

The UE monitors the PDCCH of the SpCell for a random access response identified by MsgB-RNTI while the msgB-ResponseWindow is running. If only PRACH preamble is transmitted (i.e. MsgA payload is not transmitted in PUSCH occasion) during the MsgA transmission, UE monitors PDCCH addressed to MsgB-RNTI for receiving fallback information from gNB.

If both PRACH preamble and MsgA payload is transmitted during the MsgA transmission, the UE monitors the PDCCH addressed to MsgB-RNTI for receiving fallback information or success information from gNB. In this case, if C-RNTI MAC CE was included in the MsgA: the UE additionally monitors the PDCCH of the SpCell for random access response identified by the C-RNTI while the msgB-ResponseWindow is running.

MSGB-RNTI=1+$s\_id$+14×$t\_id$+14×80×$f\_id$+14×80× 8×$ul\_carrier\_id$+14×80×8×2 where s_id is the index of the first OFDM symbol of the PRACH occasion (0≤s_id<14), t_id is the index of the first slot of the PRACH occasion in a system frame (0≤t_id<80), f_id is the index of the PRACH occasion in the frequency domain (0≤f_id<8), and ul_carrier_id is the UL carrier used for Random Access Preamble transmission (0 for NUL carrier, and 1 for SUL carrier).

Step 3: While msgB-ResponseWindow is running:

If C-RNTI was included in MsgA, the UE receives PDCCH addressed to C-RNTI, and this random access procedure was initiated for BFR: RAR reception is successful. The RA procedure is successfully completed. According to an embodiment of the disclosure, this operation is performed only if both PRACH preamble and MsgA payload is transmitted during the MsgA transmission. Go to step 8.

Else If C-RNTI was included in MsgA and Time Alignment Timer (TAT) timer associated with Primary Timing Advance Group (PTAG) is running and UE receives PDCCH addressed to C-RNTI and this PDCCH contains UL grant for new transmission: RAR reception is successful. RA procedure is successfully completed. UE releases the 2 step CFRA resources (random access preamble(s), RACH occasions, PUSCH resources) configured (if any) for this random access procedure. Release here means that the UE will not use these resources for subsequent random access procedure. According to an embodiment of the disclosure, this operation is performed only if both PRACH preamble and MsgA payload is transmitted during the MsgA transmission. Go to step 8. The release operation may not be performed in this case, as contention free resources may not be configured for the case where PTAG is running and RA is initiated for events other than beam failure recovery (BFR).

Else If C-RNTI was included in MsgA, a TAT timer associated with PTAG is not running, and the UE receives PDCCH addressed to C-RNTI and DL transport block (TB) scheduled by this PDCCH includes Absolute timing advanced command MAC CE: RAR reception is successful. RA procedure is successfully completed. The UE releases the 2 step CFRA resources (random access preamble(s), RACH occasions, PUSCH resources) configured (if any) for this random access procedure. This operation is performed only if both PRACH preamble and MsgA payload is transmitted during the MsgA transmission. Go to step 8. Release here means that UE will not use these resources for subsequent random access procedure.

Else If the UE receives PDCCH addressed to MsgB-RNTI and decoded TB includes fallbackRAR MAC subPDU corresponding to its transmitted preamble: RAR reception is successful.

If the random access preamble transmitted is contention free random access preamble: RA procedure is successfully completed. The UE releases the 2 step CFRA resources (random access preamble(s), RACH occasions, PUSCH resources) configured (if any) for this random access procedure. Process the receive TA command for SpCell. Transmit MsgA MAC PDU as Msg3 in UL grant received in fallbackRAR. Go to step 8. Release here means that UE will not use these resources for subsequent random access procedure.

Else

Process the receive TA command for SpCell. Transmit MsgA MAC PDU as Msg3 in UL grant received in fallbackRAR Start contention resolution timer
Go to step 5

Else If the UE receives PDCCH addressed to MsgB-RNTI and decoded TB includes successRAR MAC subPDU corresponding to UE's contention resolution identity (i.e. contention resolution identity received matches the first 48 bits of CCCH SDU transmitted in MsgA): RAR reception is successful. RA procedure is successfully completed. Go to step 8. Note that this is the case when CCCH SDU is included in MsgA, that is UE is in idle/inactive or performing RRC connection re-establishment. For these cases contention free resources are not configured, so they will not need to be released. In an alternate embodiment, the UE releases the 2 step CFRA resources (random access preamble(s), RACH occasions, PUSCH resources) configured (if any) for this random access procedure means that the UE will not use these released resources for subsequent random access procedure.

Step 4: If RAR window (i.e. msgB-ResponseWindow) expires:

Increment PREAMBLE_TRANSMISSION_COUNTER by 1.

If msgATransMax is configured, and if PREAMBLE_TRANSMISSION_COUNTER= msgATransMax+1:

Switch to 4 step RA. Go to step 7.

Else:

go to step 1

Step 5: While contention resolution timer is running:

If the Random Access procedure was initiated for beam failure recovery and the UE receives PDCCH transmission addressed to the C-RNTI; or if the Random Access procedure was initiated by a PDCCH order and the UE receives PDCCH transmission addressed to the C-RNTI; or if the Random Access procedure was initiated by the MAC sublayer itself or by the RRC sublayer and the UE receives PDCCH transmission addressed to the C-RNTI and contains a UL grant for a new transmission: Contention Resolution is successful; RA procedure is successfully completed. Release 2 step CFRA Resources i.e. preambles/ROs/PUSCH Resources configured (if any) for this RA procedure. Go to step 8. Release here means that UE will not use these resources for subsequent random access procedure.

Step 6: If contention resolution timer expires:

Increment PREAMBLE_TRANSMISSION_COUNTER by 1.

If msgATransMax is configured, and if PREAMBLE_TRANSMISSION_COUNTER= msgATransMax+1:

Switch to 4 step RA. Go to step 7.

Else:

go to step 1

Step 7: perform 4 step RA.

Step 8. Stop 2 step CFRA resource signaling according to an embodiment of the disclosure is explained below.

PUSCH Resource Signalling: According to an embodiment of the disclosure, PUSCH resource configuration for 2 step CFRA is separately configured from PUSCH resource configuration for 2 step CBRA.

For the PUSCH resource configuration for 2 step CBRA, msgA-PUSCH-ResourceList is included in common configuration of BWP. It is a list of MsgA-PUSCH-Resource. MsgA-PUSCH-Resource IE includes PUSCH parameters to determine PUSCH occasions. If 2 step RA is supported in a BWP and msgA-PUSCH-ResourceList is not included in common configuration of that BWP, msgA-PUSCH-ResourceList from initial BWP is used.

For the 2 step CFRA configuration, msgA-PUSCH-Resource-CFRA is included in RACH-ConfigDedicated IE of RRC Reconfiguration message. msgA-PUSCH-Resource-CFRA applies to BWP indicated by parameter first active uplink BWP. msgA-PUSCH-Resource-CFRA includes PUSCH parameters to determine PUSCH occasions. MCS/number of PRBs for each PUSCH occasion is part of msgA-PUSCH-Resource-CFRA MsgA-PUSCH-Resource/msgA-PUSCH-Resource-CFRA parameters:

frequencyStartMsgAPUSCH: UE determines first resource block (RB) for a first PUSCH occasion in an UL BWP from frequencyStartMsgAPUSCH that provides an offset, in number of RBs in the UL BWP, from a first RB of the UL BWP.

nrofPRBsperMsgAPO: A PUSCH occasion includes a number of RBs provided by nrofPRBsperMsgAPO.

guardBandMsgAPUSCH: Consecutive PUSCH occasions in the frequency domain of an UL BWP are separated by a number of RBs provided by guardBandMsgAPUSCH.

nrMsgAPO-FDM: A number of PUSCH occasions in the frequency domain of an UL BWP is provided by nrMsgAPO-FDM.

msgAPUSCH-timeDomainOffset: The UE determines a first slot for a first PUSCH occasion in an UL BWP from msgAPUSCH-timeDomainOffset that provides an offset, in number of slots in the UL BWP, relative to the start of each PRACH slot.

guardPeriodMsgAPUSCH: Consecutive PUSCH occasions within each slot are separated by guardPeriodMsgAPUSCH symbols and have same duration.

nrofMsgAPOperSlot: A number $N_t$ of time domain PUSCH occasions in each slot is provided by nrofMsgAPOperSlot, nrofSlotsMsgAPUSCH: A number of consecutive slots that include PUSCH occasions is provided by nrofSlotsMsgAPUSCH.

startSymbolAndLengthMsgAPO: Starting symbol and length of PUSCH occasion in a PUSCH slot is given by startSymbolAndLengthMsgAPO msgA-DMRS-Configuration: A UE is provided a DMRS configuration for a PUSCH transmission in a PUSCH occasion in an active UL BWP by msgA-DMRS-Configuration.

msgA-MCS: A UE is provided an MCS for data information in a PUSCH transmission for a PUSCH occasion by msgA-MCS.

If msgA-PUSCH-Resource-CFRA is not signaled by GNB for 2 step CFRA:

The UE uses MsgA-PUSCH-Resource from msgA-PUSCH-ResourceList configured for 2 step CBRA. In case msgA-PUSCH-ResourceList includes both group A and group PUSCH resources:

The UE can use PUSCH Resource configuration corresponding to group A from configuration for 2 step CBRA; or The UE can use PUSCH Resource configuration corresponding to group B from configuration for 2 step CBRA; or The PUSCH Resource configuration (group A or group B) to be used from configuration for 2 step CBRA is indicated in 2 step CFRA configuration; or The UE can select PUSCH Resource configuration corresponding to group A or group B based on MsgA MAC PDU size E.g. if the potential MsgA payload size (UL data available for transmission plus MAC header and, where required, MAC CEs) is greater than group A MsgA size and the pathloss is less than PCMAX (of the Serving Cell performing the Random Access Procedure)—preambleReceivedTargetPower—msgA-DeltaPreamble—messagePowerOffsetGroupB: select group B. Otherwise, select the group A.

According to an embodiment of the disclosure, for 2 step CFRA, in RACH-ConfigDedicated, the RA preamble index is signalled for one or more SSBs/CSI-RSs. rach-ConfigGeneric2step (to provide ROs which are different from 2 step CBRA) can also be signalled in RACH-ConfigDedicated. msgA-SSB-sharedRO-MaskIndex can also be signaled (in RACH-ConfigDedicated, note that msgA-SSB-sharedRO-MaskIndex is configured separately for 2 step CBRA and 2 step CFRA) in case ROs for 2 step CFRA are shared with 4 step and indicated which of the 4 step ROs are shared with 2 step CFRA. For an SSB, there can be several ROs and msgA-SSB-sharedRO-MaskIndex is used to indicated a subset of these ROs.

TABLE 1

```
RACH-ConfigDedicated ::=         SEQUENCE {
cfra-TwoStep-r16      CFRA-2STEP
}
CFRA-2STEP ::=                   SEQUENCE {
occasions             SEQUENCE {
   rach-ConfigGeneric2step            RACH-ConfigGeneric,
   ssb-perRACH-Occasion               ENUMERATED {oneEighth, oneFourth,
oneHalf, one, two, four, eight, sixteen }
                                      OPTIONAL -- Cond SSB-CFRA
}
msgA-PUSCH-Resource-CFRA                      MsgA-PUSCH-Resource-r16
msgA-SSB-sharedRO-MaskIndex-r16                      INTEGER (1..15)
resources             CHOICE {
   ssb                SEQUENCE {
     ssb-ResourceList            SEQUENCE (SIZE(1..maxRA-SSB-
Resources)) OF CFRA-SSB-Resource,
     ra-ssb-OccasionMaskIndex           INTEGER (0..15)
   },
   csirs              SEQUENCE {
     csirs-ResourceList          SEQUENCE (SIZE(1..maxRA-CSIRS-
Resources)) OF CFRA-CSIRS-Resource,
     rsrp-ThresholdCSI-RS               RSRP-Range
   }
  },
}
```

TABLE 1-continued

```
CFRA-SSB-Resource ::=            SEQUENCE {
   ssb                  SSB-Index,
   ra-PreambleIndex              INTEGER (0..63),
   ...
}
CFRA-CSIRS-Resource ::=          SEQUENCE {
   csi-RS               CSI-RS-Index,
   ra-OccasionList               SEQUENCE (SIZE(1..maxRA-
OccasionsPerCSIRS)) OF INTEGER (0..maxRA-Occasions-1),
   ra-PreambleIndex              INTEGER (0..63),
   ...
}
-- TAG-RACH-CONFIGDEDICATED-STOP
-- ASN1STOP
```

PRACH occasions/preambles mapping to PUSCH occasions:

The PRACH occasions/preambles for 2 step contention free random access resources may be mapped to PUSCH occasions as follows:

The UE determines a set of all the 2 step contention free preambles used by gNB. Note that ra-PreambleIndex(s) assigned to UE for SSBs/CSI-RSs belongs to this set. UE can determine the set of 2 step contention free preambles as follows:

If ROs for 2 step CFRA are same as ROs for 2 step CBRA and these ROs are shared with 4 step CBRA:

Step 1: The UE first determines X, the total number of Random Access preambles used for random access. X is given by parameter totalNumberOfRA-Preambles. The parameter totalNumberOfRA-Preambles is signaled by gNB in 4 step RACH configuration (i.e. in RACH-ConfigCommon IE). If totalNumberOfRA-Preambles is signaled, preambles from preamble index 0 to preamble index X−1 are used for random access. If totalNumberOfRA-Preambles is not signaled by gNB, all 64 preambles are used for random access.

Step 2: The UE then determine the contention based random access preambles used for 4 step RA For 4 step CBRA, the UE is provided a number N of SS/PBCH blocks associated with one PRACH occasion and a number R of contention based preambles per SS/PBCH block per valid PRACH occasion by ssb-perRACH-OccasionAndCB-PreamblesPerSSB. The parameter ssb-perRACH-OccasionAndCB-PreamblesPerSSB is signaled by gNB in 4 step RACH configuration (i.e. in RACH-ConfigCommon IE). If N<1, one SS/PBCH block is mapped to 1/N consecutive valid PRACH occasions and R contention based preambles with consecutive indexes associated with the SS/PBCH block per valid PRACH occasion start from zero. If N≥1, R contention based preambles with consecutive indexes associated with SS/PBCH block n, 0≤n≤N−1, per valid PRACH occasion start from preamble index $n \cdot N_{preamble}^{total}/N$ where $N_{preamble}^{total}$ is provided by totalNumberOfRA-Preambles, and is an integer multiple of N.

Step 3: The UE then determines the contention based random access preambles used for 2 step RA.

For 2 step CBRA with common PRACH occasions with 4 step CBRA, a UE is provided a number N1 of SS/PBCH blocks associated with one PRACH occasion by ssb-perRACH-OccasionAndCB-PreamblesPerSSB and a number R1 of contention based preambles per SS/PBCH block per valid PRACH occasion by msgA-CB-PreamblesPerSSB. The R1 contention based preambles per SS/PBCH block per valid PRACH occasion for 2 step CBRA start after the ones for 4 step CBRA. If N1<1, one SS/PBCH block is mapped to 1/N1 consecutive valid PRACH occasions and R1 contention based preambles for 2 step CBRA with consecutive indexes associated with the SS/PBCH block per valid PRACH occasion start from 'R'. If N1>=1, for 2 step CBRA R1 contention based preambles with consecutive indexes associated with SS/PBCH block n, 0≤n≤N1−1, per valid PRACH occasion start from preamble index 'R'+ $n \cdot N_{preamble}^{total}/N$ where $N_{preamble}^{total}$ is provided by totalNumberOfRA-Preambles, and is an integer multiple of N.

The set of all the 2 step contention free preambles used by the gNB consists of random access preambles used for random access excluding the contention based random access preambles used for 4 step RA and the contention based random access preambles used for 2 step RA. For example, assume as determined in step 1, random access preambles used for random access are 0 to 63. As determined in step 2, contention based random access preambles used for 4 step RA are 0 to 7 and 31 to 38. As determined in step 3, contention based random access preambles used for 2 step RA are 8 to 15 and 39 to 45. So all the 2 step contention free preambles used by gNB are: 16 to 30 and 46 to 63.

If ROs for 2 step CFRA are same as ROs for 2 step CBRA and these ROs are shared with 4 step CBRA (Alternate):

Step 1: The UE first determine X, the total number of Random Access preambles used for random access. X is given by parameter totalNumberOfRA-Preambles. The parameter totalNumberOfRA-Preambles is signaled by gNB in 4 step RACH configuration (i.e. in RACH-ConfigCommon IE). If totalNumberOfRA-Preambles is signaled, preambles from preamble index 0 to preamble index X−1 are used for random access. If totalNumberOfRA-Preambles is not signaled by gNB, all 64 preambles are used for random access.

Step 2: The UE then determine the contention based random access preambles used for 4 step RA For 4 step CBRA, the UE is provided a number N of SS/PBCH blocks associated with one PRACH occasion and a number R of contention based preambles per SS/PBCH block per valid PRACH occasion by ssb-perRACH-OccasionAndCB-PreamblesPerSSB. The parameter ssb-perRACH-OccasionAndCB-PreamblesPerSSB is signaled by gNB in 4 step RACH configuration (i.e. in RACH-ConfigCommon IE). If N<1, one SS/PBCH block is mapped to 1/N consecutive valid PRACH occasions and R contention based preambles with consecutive indexes associated with the SS/PBCH block per valid PRACH occasion start from zero. If N≥1, R contention based preambles with consecutive indexes associated with SS/PBCH block n, 0≤n≤N−1, per valid PRACH occasion start from preamble index $n \cdot N_{preamble}^{total}/N$ where $N_{preamble}^{total}$ is provided by total-NumberOfRA-Preambles, and is an integer multiple of N.

Step 3: The UE then determines the contention based random access preambles used for 2 step RA.

For 2 step CBRA with common PRACH occasions with 4 step CBRA, a UE is provided a number N1 of SS/PBCH blocks associated with one PRACH occasion by ssb-per-RACH-OccasionAndCB-PreamblesPerSSB and a number R1 of contention based preambles per SS/PBCH block per valid PRACH occasion by msgA-CB-PreamblesPerSSB. The R1 contention based preambles per SS/PBCH block per valid PRACH occasion for 2 step CBRA start after the ones for 4 step CBRA. If N1<1, one SS/PBCH block is mapped to 1/N1 consecutive valid PRACH occasions and R1 contention based preambles with consecutive indexes associated with the SS/PBCH block per valid PRACH occasion start from 'R'. If N1>=1, R1 contention based preambles with consecutive indexes associated with SS/PBCH block n, 0≤n≤N1−1, per valid PRACH occasion start from preamble index 'R'+$n \cdot N_{preamble}^{total}/N$ where $N_{preamble}^{total}$ is provided by totalNumberOfRA-Preambles, and is an integer multiple of N.

Step 4: The UE then determine the contention free random access preambles used for 2 step RA.

For 2 step CBRA with common PRACH occasions with 4 step CBRA, a UE is provided a number N1 of SS/PBCH blocks associated with one PRACH occasion by ssb-per-RACH-OccasionAndCB-PreamblesPerSSB and a number R1 of contention based preambles per SS/PBCH block per valid PRACH occasion by msgA-CB-PreamblesPerSSB and a number R2 of contention free preambles per SS/PBCH block per valid PRACH occasion by msgA-CF-PreamblesPerSSB. If N1<1, one SS/PBCH block is mapped to 1/N1 consecutive valid PRACH occasions and R2 contention free preambles with consecutive indexes associated with the SS/PBCH block per valid PRACH occasion start from 'R+R1'. If N1>=1, R2 contention based preambles with consecutive indexes associated with SS/PBCH block n, 0≤n≤N1−1, per valid PRACH occasion start from preamble index 'R+R1'+$n \cdot N_{preamble}^{total}/N$ where $N_{preamble}^{total}$ is provided by totalNumberOfRA-Preambles, and is an integer multiple of N.

If ROs for 2 step CFRA are same as ROs for 2 step CBRA and these ROs are not shared with 4 step CBRA.
- Step 1: The UE first determine X, the total number of Random Access preambles used for 2 step random access. X is given by parameter msgA-totalNumberOfRA-Preambles. The parameter msgA-totalNumberOfRA-Preambles is signaled by gNB in 2 step RACH configuration (i.e., in RACH-ConfigCommonTwoStepRA IE). If msgA-totalNumberOfRA-Preambles is signaled, preambles from preamble index 0 to preamble index X−1 are used for 2 step random access. If msgA-totalNumberOfRA-Preambles is not signaled by gNB, all 64 preambles are used for 2 step random access.
- Step 2: The UE then determine the contention based random access preambles used for 2 step RA For 2 step CBRA, the UE is provided a number N of SS/PBCH blocks associated with one PRACH occasion and a number R of contention based preambles per SS/PBCH block per valid PRACH occasion by msgA-ssb-perRACH-OccasionAndCB-PreamblesPerSSB. The parameter msgA-ssb-perRACH-OccasionAndCB-PreamblesPerSSB is signaled by gNB in 4 step RACH configuration (i.e. in RACH-ConfigCommonTwoStepRA IE). If N<1, one SS/PBCH block is mapped to 1/N consecutive valid PRACH occasions and R contention based preambles with consecutive indexes associated with the SS/PBCH block per valid PRACH occasion start from zero. If N≥1, R contention based preambles with consecutive indexes associated with SS/PBCH block n, 0≤n≤N−1, per valid PRACH occasion start from preamble index $n \cdot N_{preamble}^{total}/N$ where $N_{preamble}^{total}$ is provided by msgA-totalNumberOfRA-Preambles, and is an integer multiple of N.

The set of all the 2 step contention free preambles used by the gNB consists of random access preambles used for 2 step random access excluding the contention based random access preambles used for 2 step RA. For example, assume that as determined in step 1, random access preambles used for 2 step random access are 0 to 63. As determined in step 2, contention based random access preambles used for 2 step RA are 0 to 7 and 31 to 38. So all the 2 step contention free preambles used by gNB are: 8 to 30 and 39 to 63.

If ROs for 2 step CFRA are same as ROs for 2 step CBRA and these ROs are not shared with 4 step CBRA (Alternate).
- Step 1: The UE first determine X, the total number of Random Access preambles used for 2 step random access. X is given by parameter msgA-totalNumberOfRA-Preambles. The parameter msgA-totalNumberOfRA-Preambles is signaled by gNB in 2 step RACH configuration (i.e. in RACH-ConfigCommonTwoStepRA IE). If msgA-totalNumberOfRA-Preambles is signaled, preambles from preamble index 0 to preamble index X−1 are used for 2 step random access. If msgA-totalNumberOfRA-Preambles is not signaled by gNB, all 64 preambles are used for 2 step random access.
- Step 2: The UE then determines the contention based random access preambles used for 2 step RA For 2 step CBRA, the UE is provided a number N of SS/PBCH blocks associated with one PRACH occasion and a number R of contention based preambles per SS/PBCH block per valid PRACH occasion by msgA-ssb-perRACH-OccasionAndCB-PreamblesPerSSB. The parameter msgA-ssb-perRACH-OccasionAndCB-PreamblesPerSSB is signaled by gNB in 4 step RACH configuration (i.e. in RACH-ConfigCommonTwoStepRA IE). If N<1, one SS/PBCH block is mapped to 1/N consecutive valid PRACH occasions and R contention based preambles with consecutive indexes associated with the SS/PBCH block per valid PRACH occasion start from zero. If N≥1, R contention based preambles with consecutive indexes associated with SS/PBCH block n, 0≤n≤N−1, per valid PRACH occasion start from preamble index $n \cdot N_{preamble}^{total}/N$ where $N_{preamble}^{total}$ is provided by msgA-totalNumberOfRA-Preambles, and is an integer multiple of N.

Step 3: The UE then determines the contention free random access preambles used for 2 step RA.

The UE is provided a number N of SS/PBCH blocks associated with one PRACH occasion and a number R of contention based preambles per SS/PBCH block per valid PRACH occasion by msgA-ssb-perRACH-OccasionAndCB-PreamblesPerSSB and a number R1 of contention free preambles per SS/PBCH block per valid PRACH occasion by msgA-CF-PreamblesPerSSB. If N<1, one SS/PBCH block is mapped to 1/N consecutive valid PRACH occasions and R1 contention free preambles with consecutive indexes associated with the SS/PBCH block per valid PRACH occasion start from 'R'. If N>=1, R1 contention based preambles with consecutive indexes associated with SS/PBCH block n, 0≤n≤N−1, per valid PRACH occasion start from preamble index 'R'+$n \cdot N_{preamble}^{total}/N$ where $N_{preamble}^{total}$ is provided by msgA-totalNumberOfRA-Preambles, and is an integer multiple of N.

If ROs for 2 step CFRA are not same as ROs for 2 step CBRA (i.e. separately configured for 2 step CFRA).

In this case, all preambles (i.e., 0 to 63) are 2 step contention free random access preambles. Alternately, network can signal X i.e. the total number of Random Access preambles used for 2 step contention free random access. X is signaled in RACH config dedicated IE. If X is signaled, preambles from preamble index 0 to preamble index X−1 are used for 2 step contention free random access.

According to an embodiment of the disclosure, the gNB can signal starting preamble index and number of preamble indexes for indicating 2 step contention free random access preambles. In an alternate embodiment for indicating 2 step contention free random access preambles, a list of one or more entries can be signaled wherein each entry in the list indicates starting preamble index and number of preamble indexes.

The PRACH occasions/preambles for 2 step contention free random access resources are mapped to PUSCH occasions as follows:

A consecutive number of $N_{preamble}$ contention free preamble indexes from valid PRACH occasions in a PRACH slot
- first, in increasing order of preamble indexes within a single PRACH occasion
- second, in increasing order of frequency resource indexes for frequency multiplexed PRACH occasions
- third, in increasing order of time resource indexes for time multiplexed PRACH occasions within a PRACH slot are mapped to a valid PUSCH occasion
- first, in increasing order of frequency resource indexes $f_{id}$ for frequency multiplexed PUSCH occasions
- second, in increasing order of DMRS indexes within a PUSCH occasion, where a DMRS index $DMRS_{id}$ is determined first in an ascending order of a DMRS port index and second in an ascending order of a DMRS sequence index
- third, in increasing order of time resource indexes $t_{id}$ for time multiplexed PUSCH occasions within a PUSCH slot
- fourth, in increasing order of indexes for PUSCH slots corresponding to this PRACH slot where $N_{preamble} = \text{ceil}/(T_{preamble}/T_{PUSCH})$, $T_{preamble}$ is a total number of contention free preambles in valid PRACH occasions per association pattern period, and $T_{PUSCH}$ is a total number of valid sets of PUSCH occasions per association pattern period multiplied by the number of DMRS indexes per valid PUSCH occasion.

PUSCH Occasion Selection for 2 step CFRA based on SSB:

The UE first selects an SSB, where the selected SSB is the one for which SS-RSRP is above a configured threshold (the threshold is signalled by the gNB).

The UE selects a preamble (indicated by ra-PreambleIndex) corresponding to selected SSB.

The UE then selects an RO corresponding to selected SSB as specified in TS 38.321 (note that ROs are mapped to SSBs as defined earlier and UE select one of ROs mapped to selected SSB).

The UE then selects a PUSCH occasion from PUSCH occasions corresponding to PRACH slot of selected RO. The UE selects the PUSCH occasion corresponding to selected RO and preamble.

The UE then transmits the selected preamble and MsgA MAC PDU in selected PRACH occasion and PUSCH occasion, respectively.

PUSCH Occasion Selection for 2 step CFRA based on CSI-RS:

The UE first selects CSI-RS, where the selected CSI-RS is the one for which CSI-RSRP is above a configured threshold (threshold is signaled by gNB).

The UE selects a preamble (indicated by ra-PreambleIndex) corresponding to selected CSI-RS The UE then selects an RO (indicated by ra-OccasionList) corresponding to selected CSI-RS (note that ROs are mapped to SSBs as defined earlier and UE select one of ROs mapped to selected SSB).

The UE then selects a PUSCH occasion from PUSCH occasions corresponding to PRACH slot of selected RO. The UE selects the PUSCH occasion corresponding to the selected RO and preamble.

Figure 4:
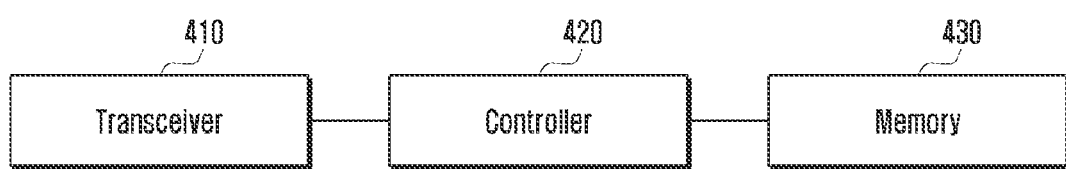
FIG. 4 is a block diagram of a terminal according to an embodiment of the disclosure.

The UE then transmits the selected preamble and MsgA MAC PDU in selected PRACH occasion and PUSCH occasion respectively FIG. 4 is a block diagram of a terminal, (e.g., a UE) according to an embodiment of the disclosure.

Referring to FIG. 4, the terminal includes a transceiver 410, a controller 420 and a memory 430. The controller 420 may refer to circuitry, an ASIC, or at least one processor. The transceiver 410, the controller 420, and the memory 430 are configured to perform at least one operation including a combination of steps, which are not in conflict, illustrated in at least one of the drawings or described above. Although the transceiver 410, the controller 420, and the memory 430 are shown as separate entities, they may be realized as a single entity, such as a single chip. Alternatively, the transceiver 410, the controller 420, and the memory 430 may be electrically connected to or coupled with each other.

The transceiver 410 may transmit and receive signals to and from other network entities, e.g., a base station.

The controller 420 may control the UE to perform functions according at least one operation described above.

The operations of the terminal may be implemented using the memory 430 storing corresponding program codes. The terminal may be equipped with the memory 430 to store program codes implementing desired operations. To perform the desired operations, the controller 420 may read and execute the program codes stored in the memory 430 by using a processor or a central processing unit (CPU).

Figure 5:
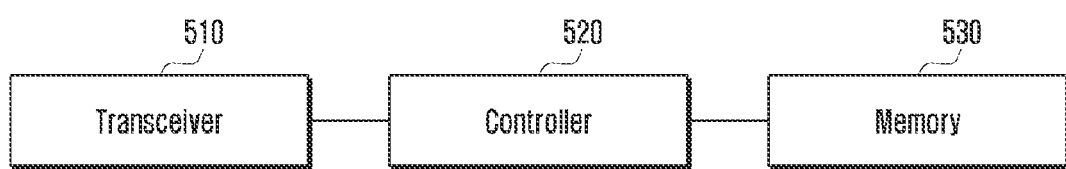
FIG. 5 is a block diagram of a base station according to an embodiment of the disclosure.

FIG. 5 is a block diagram of a base station (e.g., a gNB) according to an embodiment of the disclosure.

Referring to FIG. 5, the base station (BS) includes a transceiver 510, a controller 520 and a memory 530. The controller 520 may refer to a circuitry, an ASIC, or at least one processor. The transceiver 510, the controller 520, and the memory 530 are configured to perform at least one operation including a combination of steps, which are not in conflict, illustrated in at least one of the drawings or described above. Although the transceiver 510, the controller 520, and the memory 530 are shown as separate entities, they may be realized as a single entity like a single chip. Alternatively, the transceiver 510, the controller 520, and the memory 530 may be electrically connected to or coupled with each other.

The transceiver 510 may transmit and receive signals to and from other network entities, e.g., a terminal.

The controller 520 may control the BS to perform functions according to at least one operation described above.

The operations of the BS may be implemented using the memory 530 storing corresponding program codes. The BS may be equipped with the memory 530 to store program codes implementing desired operations. To perform the desired operations, the controller 520 may read and execute the program codes stored in the memory 530 by using a processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal of a 2-step random access procedure in a wireless communication system, the method comprising:
    transmitting a message A (MsgA) for the 2-step random access procedure;
    monitoring, during a window, a physical downlink control channel (PDCCH) for a message B (MsgB), wherein a starting point of the window depends on whether a transmission of a payload of the MsgA on a physical uplink shared channel (PUSCH) is performed along with a transmission of a random access preamble of the MsgA on a physical random access channel (PRACH); and
    receiving downlink control information on the PDCCH for the MsgB.

2. The method of claim 1, wherein, in case that the transmission payload of the MsgA on the PUSCH is performed along with the transmission of the random access preamble of the MsgA on the PRACH, the window starts at a starting symbol of an earliest resource for monitoring the PDCCH after a last symbol of a PUSCH occasion corresponding to the PRACH.

3. The method of claim 1, wherein, in case that only the random access preamble of the MsgA is transmitted on the PRACH without the transmission of the payload of the MsgA on the PUSCH, the starting point of the window further depends on whether a PUSCH occasion corresponding to the PRACH is valid.

4. The method of claim 3, wherein, in case that the PUSCH occasion corresponding to the PRACH is valid, the window starts at a starting symbol of an earliest resource for monitoring the PDCCH after a last symbol of the PUSCH occasion corresponding the PRACH.

5. The method of claim 3, wherein, in case that the PUSCH occasion corresponding to the PRACH is not valid, the window starts at a starting symbol of an earliest resource for monitoring the PDCCH after a last symbol of a PRACH occasion corresponding to the PRACH.

6. The method of claim 1, further comprising:
    receiving a control message including information on a search space for a random access procedure.

7. The method of claim 6, wherein the downlink control information on the PDCCH is detected in the search space based on the information.

8. A terminal for performing a 2-step random access procedure in a wireless communication system, the terminal comprising:
    a transceiver; and
    at least one processor configured to:
        transmit, via the transceiver, a message A (MsgA) for the 2-step random access procedure,
        monitor, during a window, a physical downlink control channel (PDCCH) for a message B (MsgB), wherein a starting point of the window depends on whether a transmission of a payload of the MsgA on a physical uplink shared channel (PUSCH) is performed along with a transmission of a random access preamble of the MsgA on a physical random access channel (PRACH), and
        receive, via the transceiver, downlink control information on the PDCCH for the MsgB.

9. The terminal of claim 8, wherein, in case that the transmission payload of the MsgA on the PUSCH is performed along with the transmission of the random access preamble of the MsgA on the PRACH, the window starts at a starting symbol of an earliest resource for monitoring the PDCCH after a last symbol of a PUSCH occasion corresponding to the PRACH.

10. The terminal of claim 8, wherein, in case that only the random access preamble of the MsgA is transmitted on the PRACH without the transmission of the payload of the MsgA on the PUSCH, the starting point of the window further depends on whether a PUSCH occasion corresponding to the PRACH is valid.

11. The terminal of claim 10, wherein, in case that the PUSCH occasion corresponding to the PRACH is valid, the window starts at a starting symbol of an earliest resource for monitoring the PDCCH after a last symbol of the PUSCH occasion corresponding the PRACH.

12. The terminal of claim 10, wherein, in case that the PUSCH occasion corresponding to the PRACH is not valid, the window starts at a starting symbol of an earliest resource for monitoring the PDCCH after a last symbol of a PRACH occasion corresponding to the PRACH.

13. The terminal of claim 8, wherein the at least one processor is further configured to:
    receive, via the transceiver, a control message including information on a search space for a random access procedure.

14. The terminal of claim 13, wherein the downlink control information on the PDCCH is detected in the search space based on the information.

* * * * *